UNITED STATES PATENT OFFICE 2,019,908

METHOD OF PLUGGING STRATA IN WELLS

Harvey T. Kennedy, Wilkinsburg, and Howard C. Lawton, Pittsburgh, Pa., assignors to Gulf Research & Development Corporation, Wilmington, Del., a corporation of Delaware No Drawing. Application April 8, 1935, Serial No. 15,350

8 Claims. (Cl. 61—36)

This invention relates to methods of plugging strata in wells; and it comprises a method of sealing off strata adjacent a well wherein there is injected into such strata, in the presence of water, a solution of a silicon halogen compound or sometimes of a titanium halogen compound, in a suitable non-aqueous liquid such as oil, the compound forming a plugging, cementitious deposit on hydrolysis, in the interstices of the strata, and the solution is kept in the strata in the presence of water to bring about such hydrolysis and seal up the strata; all as more fully hereinafter set forth and as claimed.

It is often necessary to shut off inflows of underground water to earth bores. The problem of sealing off water and the necessity for sealing off, are of special importance in the case of oil wells. Oil wells often penetrate water bearing sands closely adjacent the oil producing sands. These water sands are usually unstable; they cave and obstruct the well. Formations are often encountered which produce a mixture of oil and water. Inflow of water along with the oil is objectionable for many reasons. The well equipment is corroded, pumping expenses are increased, and moreover stubborn emulsions of oil and water may be formed which are difficult to break. An unrestricted flow of water into an oil well may ruin it for all practical purposes. Since an oil well ordinarily represents an investment of considerable magnitude, water must be sealed off even if this is difficult and expensive.

Methods in common use for shutting off water leave much to be desired. One much-used expedient is to let down an extra steel casing or casings to case off the water bearing zone. This is troublesome and time-consuming and each extra casing reduces the effective diameter of the bore. Moreover this expedient can not be used in the case of closely alternating oil and water strata.

Some wet formations, and even some dry formations, are unstable and tend to cave, for example during drilling. A caving formation such as a stratum of water sands may cause considerable trouble in well operations, and it is desirable to close off or strengthen such formations. Means hitherto proposed for such work are similar to water shut off methods, and have similar limitations.

One achieved object of the present invention is the provision of a simple water shut-off method applicable to all sorts of well conditions, and producing an effective seal in the water bearing strata by chemical action.

Another achieved object is the provision of a method for cementing and solidifying unstable, loose or caving formations in a well bore.

In plugging water bearing strata, according to the invention there is injected into the strata a suitable non-aqueous liquid containing in solution a silicon or titanium halogen compound. Upon allowing the solution to remain in the water strata, the ground waters gradually penetrate and diffuse into the solution, reacting with the dissolved compound, with the production of an insoluble sealing deposit in the interstices of the water strata. In solidifying or consolidating shifting layers, a similar procedure is followed. Unstable rocky or sandy strata usually carry enough water to bring about the desired action, but in case the unstable strata are too dry, water can be introduced; either before or after injection of the treating solution. The water shut off function and the consolidating or cementing function are closely allied. Sometimes the selective shutting off of water is more important; sometimes the consolidating action is primarily desired. In some cases the present method is employed solely for the purpose of consolidating shifting layers.

Two compounds which we find especially useful are silicon tetrachlorid and titanium tetrachlorid. These can be dissolved in appropriate solvents for use in treating wells in accordance with the invention.

Silicon tetrachlorid, which we regard as being, on the whole, the best material for our purposes, is a transparent, colorless liquid at room temperatures. On exposure to the air it evaporates and decomposes; giving off a dense white cloud or fume and leaving a residue. It dissolves in ordinary petroleum to form a stable, thin solution. In general, any organic solvent can be used provided it is inert; is not of a type which reacts with the silicon tetrachlorid. Sometimes it is convenient to employ the liquid compound as such; without admixture of other liquid.

Titanium tetrachlorid is a material of generally similar properties. It also is a liquid which fumes on exposure to air, and is decomposed. It dissolves in petroleum in all proportions, and is readily soluble in ether.

In employing either of these substances for water shut-off, we can use them directly as such; without dilution. However, for the sake of convenience in handling and to secure a somewhat delayed or gradual action, we ordinarily dissolve the liquid compound in oil, usually in the proportion of about 10 parts of the tetrachlorid to 90 parts oil, by weight. Solutions of this concentration are stable in air. Both compounds are rather dense Titanium tetrachlorid has a specific gravity of about 1.7 and silicon tetrachlorid about 1.5. The pure compounds are thus almost twice as dense as most crude oils. Even when the tetrachlorids are let down with some oil, to form treating solutions, such solutions can be made to have a density greater than water and oil well brines. This often facilitates the introduction into the well. If desired, instead of dissolving the tetrachlorid in oil, it can be dissolved in a heavy organic liquid such as carbon terachlorid, to secure treating solutions of high density whatever the content of dissolved substance.

The manner of injecting the materials into the water-bearing strata depends upon the particular conditions encountered. In the case of a producing well having the usual casing and tubing and in which the fluid level during pumping remains approximately at the bottom, I inject a batch of the solution into the annular space between casing and tubing and run the pump until all oil and water are removed, leaving the solution in the well bottom. Then a load of oil is let down and pressure applied (for example hydrostatic pressure) to force the chemical into the bottom formations. In treating a flowing well, the solution is pumped down the tubing until it reaches the producing formation, and then the oil load applied, the casing head being closed to prevent flow between casing and tubing. In a well not equipped with tubing, the solution may be introduced into the bottom or other level of the well by means of a bailer. A well may be treated during the actual drilling, by pumping the solution down the drill stem and injecting by means of mud pressures. In such a procedure, it is better to make use of one of the more dilute, slower acting solutions, so that no substantial reaction will take place during the time the solution is being injected by the mud.

The solution, injected into the water formation, is allowed to remain; pressure being maintained. The ground waters gradually diffuse into the solution, reacting with the dissolved tetrachlorid. In the case of silicon tetrachlorid, complete hydrolysis produces a solid gel of silicic acid which is dense, firm and highly insoluble. There is no tendency for it to be washed out during production. An analogous reaction takes place with titanium tetrachlorid; titanic acid and hydrochloric acid being formed.

In using the process primarily for consolidating shifting or unstable rocky or sandy layers, the procedure is generally similar. If the shifting strata are sufficiently wet, as is usually the case, the procedure is exactly like that described for water shut off. If the strata are dry or substantially dry, however, water is introduced into the well and strata before or after the injection of the treating solution. Reaction then takes place in the pores of the unstable strata, as described.

Instead of the tetrachlorid, higher molecular weight chlorids of silicon and titanium may be employed in similar ways. For example, upon hydrolysis of an oil solution of silicon hexachlorid, $Si_2Cl_6$, a dense deposit of insoluble silico-oxalic acid is formed, along with HCl. The similar titanium compound $Ti_2Cl_6$ reacts in an analogous manner, forming titano-oxalic acid in the wet formations.

Other higher molecular weight chlorids, such as the octachloride of silicon and titanium may be used. But the tetrachlorids are cheap and convenient; and, as stated, silicon tetrachlorid is of particular usefulness.

In lieu of these simple chlorine compounds, substitution products such as silico-chloroform and titano-chloroform may be employed. Silicochloroform is at ordinary temperatures a liquid resembling silicon tetrachlorid and having much the same properties. It dissolves in oil in all proportions, and also dissolves in other solvents, such as benzene, carbon tetrachlorid, etc. Upon hydrolysis, it forms a precipitate of silico-formic acid.

In a specific example of one embodiment of the invention, a batch of treating solution is made up by dissolving 10 parts crude silicon tetrachlorid in 90 parts crude oil by weight. The well to be treated has the usual casing and tubing. Closely adjacent water sands and oil sands deliver flows into the well, near the bottom. The batch of solution is poured in between the casing and the tubing and oil and water standing in the well bottom is pumped out until only the solution is left. A column of oil is introduced, of height sufficient to force the solution into the formations against formation pressure, for a considerable distance. The solution is allowed to remain. After a while production is resumed and it is found that water flow is substantially cut off.

If a formation carries oil and water together, it is generally not desirable to seal it off, because there is danger of shutting off all the oil flow. In case a stratum bearing oil and water is accidentally sealed off it may be opened up again by injecting a strong alkaline solution, such as caustic soda, which cuts out the deposited material.

As stated, silicon tetrachlorid is particularly useful; and it is easily secured. Aluminum chlorid is usually manufactured for oil refining purposes, by chlorination of bauxite: impure alumina, containing silica and titanium ovid as impurities. Considerable quantities of silicon (and titanium) tetrachlorids are incidentally produced. They appear as byproducts in the waste gases. In conventional practice, these are scrubbed out with water. By substituting oil for scrubbing these waste gases, there are directly obtained oil solutions suitable for use in the present process.

The present process is simple and fool-proof. The oil solutions are cheap and are readily pumped and handled in ordinary equipment. Sealing and consolidating are effective and take place where they are wanted.

What we claim is:

1. A method of sealing or consolidating strata in a well which comprises injecting into the strata a liquid halogen compound of an element selected from the class consisting of silicon and titanium, and causing the compound, in the interstices of the strata, to react with water, with the production of an insoluble precipitate in the strata.

2. The matter of claim 1 wherein the liquid halogen compound is silicon tetrachlorid.

3. A method of sealing, cementing or consolidating porous strata in a well which comprises injecting into the strata a liquid halogen compound of an element selected from the class consisting of silicon and titanium, and causing the compound, in the interstices of the strata, to react with water, the compound being kept in the strata for a time sufficient to bring about substantial hydrolysis of the compound with production of an insoluble precipitate, and to cause the hardening of the precipitate.

4. A method of sealing or consolidating strata in a well which comprises injecting into the strata a liquid halogen compound of an element selected from the class consisting of silicon and titanium, and injecting water into the strata, so as to cause the compound in the interstices of the strata to react with the water, with the production of an insoluble precipitate in the strata.

5. A method of sealing off water-bearing strata adjacent a well wherein there is injected into the water-bearing strata, a solution of a halogen compound of an element selected from the class consisting of silicon and titanium, in an inert non-aqueous solvent, and the solution is kept in the water-bearing strata, the compound hydrolyzing with the production of an insoluble precipitate in the water strata.

6. A method of sealing off water-bearing strata adjacent a well wherein there is injected into the water-bearing strata a solution of a chlorin compound of an element selected from the class consisting of titanium and silicon, in a suitable inert non-aqueous liquid, and the solution is kept in the water-bearing strata, the compound hydrolyzing with the formation of an insoluble precipitate.

7. A method of sealing off water-bearing strata adjacent a well wherein there is injected into the strata, a solution in petroleum of a halogen compound of an element selected from the class consisting of silicon and titanium, and the solution is kept in the water-bearing strata, the compound hydrolyzing with the production of an insoluble deposit.

8. A method of sealing off water-bearing strata adjacent a well wherein there is injected into the strata a solution in petroleum of a material selected from the class consisting of silicon tetrachlorid and titanium tetrachlorid, and the solution is kept in the water-bearing strata, the material hydrolyzing with the production of an insoluble deposit.

HARVEY T. KENNEDY.
HOWARD C. LAWTON.